US011898597B2

(12) United States Patent
Hirtsiefer

(10) Patent No.: US 11,898,597 B2
(45) Date of Patent: Feb. 13, 2024

(54) FLAP BEARING HAVING AN ADJUSTMENT AID

(71) Applicant: Samet Kalip Ve Maden Esya San. Ve Tic. A.S., Istanbul (TR)

(72) Inventor: Artur Hirtsiefer, Neunkirchen-Seelscheid (DE)

(73) Assignee: Samet Kalip Ve Maden Esya San. Ve Tic. A.S.

( * ) Notice: Subject to any disclaimer, the term of this patent is extended or adjusted under 35 U.S.C. 154(b) by 1079 days.

(21) Appl. No.: 16/606,870

(22) PCT Filed: May 15, 2017

(86) PCT No.: PCT/TR2017/000057
§ 371 (c)(1),
(2) Date: Oct. 21, 2019

(87) PCT Pub. No.: WO2018/212723
PCT Pub. Date: Nov. 22, 2018

(65) Prior Publication Data
US 2020/0132112 A1    Apr. 30, 2020

(51) Int. Cl.
*E05D 15/26* (2006.01)
*F16C 11/04* (2006.01)
(Continued)

(52) U.S. Cl.
CPC ............ *F16C 11/04* (2013.01); *E05D 15/262* (2013.01); *E05F 1/12* (2013.01); *F16C 17/02* (2013.01);
(Continued)

(58) Field of Classification Search
CPC ........ F16C 11/04; F16C 17/02; E05D 15/262; E05D 15/40; E05D 15/264; E05F 1/12;
(Continued)

(56) References Cited

U.S. PATENT DOCUMENTS 2,960,718 A    11/1960 Lasier
3,978,549 A *  9/1976 Vitt ..................... E05D 3/183
                                                        16/370
(Continued)

FOREIGN PATENT DOCUMENTS

CN    101040094 A    9/2007
CN    101351609 A    1/2009
(Continued)

OTHER PUBLICATIONS

China Search Report for corresponding patent application No. 2018103850576, dated Jun. 12, 2019, 3 pages (not prior art).
(Continued)

*Primary Examiner* — Bradley Duckworth
(74) *Attorney, Agent, or Firm* — Lucian Wayne Beavers; Patterson Intellectual Property Law, PC

(57) ABSTRACT

The invention relates to a flap bearing having a pivot bearing for coupling a control arm of a prestressed lifting device in an articulated manner to a flap, folding flap, door, or the like of an item of furniture, an installation support of the flap bearing being fastened to the flap, folding flap, door, or the like, and a bearing part of the flap bearing supporting the pivot bearing and being supported on the installation support for displacing or pivoting along a displacement path. According to the invention, a positioning element is displaceably or pivotably supported on the installation support, and the positioning element is disposed in a displacement range of the bearing part along the displacement path. The invention further relates to a lifting device having such a flap bearing and a method for adjusting such a flap bearing. The flap bearing can be simply and quickly adjusted to the correct position thereof so that the flap, folding flap, door, or the like closes completely.

10 Claims, 10 Drawing Sheets

Figure 1:
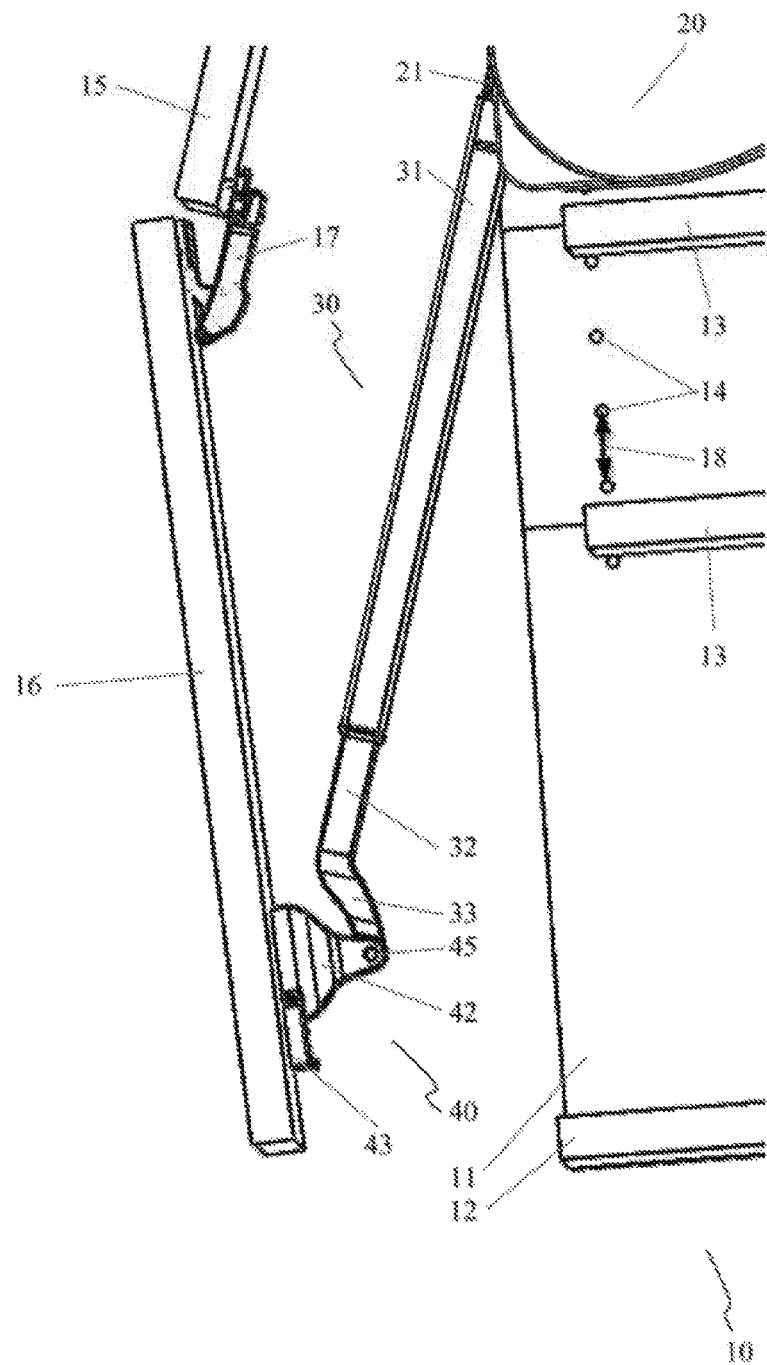

(51) Int. Cl.
*E05F 1/12* (2006.01)
*F16C 17/02* (2006.01)

(52) U.S. Cl.
CPC ....... *E05Y 2600/10* (2013.01); *E05Y 2900/20* (2013.01)

(58) Field of Classification Search
CPC ...... E05F 1/10; E05F 1/00; E05F 1/08; E05Y 2600/10; E05Y 2900/20; E05Y 2201/624; E05Y 2600/11; E05Y 2600/12; E05Y 2600/14; E05Y 2600/31; E05Y 2600/626
See application file for complete search history.

(56) References Cited

U.S. PATENT DOCUMENTS

| | | | |
|---|---|---|---|
| 4,564,973 | A | 1/1986 | Kordes |
| 6,332,660 | B1 * | 12/2001 | Salice ................... E05D 15/262 312/328 |
| 7,448,703 | B2 | 11/2008 | King |
| 8,006,580 | B2 | 8/2011 | Salice |
| 2007/0209157 | A1 | 9/2007 | Kung |
| 2007/0257538 | A1 | 11/2007 | Brunnmayr |

FOREIGN PATENT DOCUMENTS

| | | |
|---|---|---|
| DE | 202005000423 U1 | 5/2005 |
| DE | 202006020216 U1 | 1/2008 |
| DE | 102007021656 A1 | 11/2008 |
| DE | 202014102477 U1 | 10/2015 |
| EP | 107151 A1 | 5/1984 |
| EP | 1812674 A1 | 8/2007 |
| EP | 2857620 A1 | 4/2015 |
| WO | 2006039729 A1 | 4/2006 |

OTHER PUBLICATIONS

International Search Report for PCT/TR2017/000057, dated Feb. 8, 2018, 12 pages (not prior art).
Co-pending U.S. Appl. No. 16/606,874, filed May 15, 2017, 37 pages (not prior art).

* cited by examiner

FLAP BEARING HAVING AN ADJUSTMENT AID

The invention relates to a flap bearing having a pivot bearing for coupling a control arm of a prestressed lifting device in an articulated manner to a flap, folding flap, door, or the like of an item of furniture, an installation support of the flap bearing being fastened to the flap, folding flap, door, or the like, and a bearing part of the flap bearing supporting the pivot bearing and being supported on the installation support for displacing or pivoting along a displacement path.

The invention further relates to a lifting device for a flap, folding flap, door, or the like, having a flap holder, a flap bearing for attaching to the flap, folding flap, door, or the like, and a control arm connecting the flap holder and the flap bearing, an installation support of the flap bearing being fastened to the flap, folding flap, door, or the like, and a bearing part of the flap bearing supporting the pivot bearing and being supported on the installation support for displacing or pivoting along a displacement path.

The invention further relates to a method for adjusting a flap bearing having a pivot bearing relative to a flap, folding flap, door, or the like of an item of furniture, an installation support of the flap bearing being attached to the flap, folding flap, door, or the like, a bearing part of the flap bearing supporting the pivot bearing and being supported on the installation support for displacing or pivoting along a displacement path, and a control arm being connected to the pivot bearing and producing a pivoting connection between the flap bearing and a flap holder attached to a furniture frame of the item of furniture.

Flaps and folding flaps for closing upper cabinets in particular are known, and are hinged to a top or side wall of a cabinet and pivoted upward for opening the cabinet. In order to enable smooth opening and closing of the flap or folding flap, lifting devices are provided. Said devices comprise a flap holder having an energy store, typically in the form of a spring or a spring assembly attached to the furniture frame. A flap bearing is installed on the flap or folding flap. A control arm provides a hinged connection between the flap holder and the flap bearing. Said arm transmits a lifting force driven by the energy store from the flap holder to the flap bearing and thus to the flap or folding flap. The lifting force is oriented in the opening direction of the flap or folding flap. For a suitable design of the lifting device, the device holds the flap or folding flap in the open position and in any intermediate positions. In order to enable complete closing of the flap or folding flap, the position of the flap bearing must be precisely adjusted to the installed position of the flap holder and the length of the control arm. Adjustment is thereby made by displacing the position of the flap bearing accordingly by means of adjusting means provided for this purpose when the flap or folding flap is open. The position is then checked when the flap or folding flap is closed and corrected when the flap or folding flap is open again. Said iterative process is time-consuming, particularly if a lifting device is provided on both sides of the flap or folding flap and the flap bearings thereof must be adjusted separately, wherein the closed position of the flap or folding flap evaluated for checking the adjustment is influenced by both lifting devices.

The object of the invention is to create an easily and quickly adjustable flap bearing for a lifting device of a flap, folding flap, door, or the like.

A further object of the invention is to provide a lifting device having such a flap bearing.

A further object of the invention is to provide a method for easily and quickly adjusting a flap bearing of a lifting device for a flap, folding flap, door, or the like.

The object of the invention relating to the flap bearing is achieved in that a positioning element is displaceably or pivotally supported on the installation support, and the positioning element is disposed in a displacement range of the bearing part along the displacement path. When closing the flap, folding flap, door, or the like, the displaceably disposed bearing part changes position relative to the installation support such that the flap, folding flap, door, or the like is fully closed for the existing length of the control arm and the installed position of the lifting device on the item of furniture. The optimal position of the bearing part and the pivot bearing disposed thereon is then achieved. The motion of the bearing part when closing the flap, folding flap, door, or the like carries the positioning element along and displaces the same into an adjusted position. When opening the flap, folding flap, door, or the like, the bearing part is displaced away from the optimal position due to the action of the lever force. The positioning element, however, remains in the adjusted position. The bearing part can now be displaced toward the positioning element. The positioning element is not thereby displaced. The bearing part is thus disposed in the optimal position determined when the flap, folding flap, door, or the like is closed. The bearing part can be fixed in said position so that displacement is no longer possible. The positioning element serves as an adjusting aid for the adjusting procedure of the flap bearing and marks the optimal position of the bearing part. The correct position of the bearing part is adjusted when the flap, folding flap, door, or the like is open. The adjusting means provided to this end are thereby accessible and easily operated when the flap, folding flap, door, or the like is open. The correct position of the flap bearing can be determined by closing the flap, folding flap, door, or the like once and adjusted when the flap, folding flap, door, or the like is open. The time required for adjusting the flap bearing can thereby be significantly reduced relative to the adjusting procedure in which the position of the flap bearing is adjusted in an iterative process and checked by subsequently closing the flap, folding flap, door, or the like. This is particularly advantageous if two lifting devices are disposed on the flap, folding flap, door, or the like and the flap bearings thereof must be adjusted separately.

Smooth displacement of the positioning element by the bearing part can be achieved in that the displacement directions of the positioning element and the bearing part are identically oriented.

A simple design of the flap bearing enabling simple support of both the bearing part and the positioning element can be achieved in that the installation support comprises a guide and the bearing part and the positioning element are supported on the guide.

It can be advantageously provided that the bearing part and/or the positioning element are guided on a linear path or a curved path or a circular path. A linear path enables smooth displacing of the bearing part and the positioning element. A curved path can reduce the space required. Both the linear and the curved path can be provided, for example, by guiding the bearing part and/or the positioning element on correspondingly shaped guide rails or slot guides. A circular path enables pivoting support of the bearing part and the positioning element.

In order to prevent displacing the positioning element when opening the flap, folding flap, door, or the like, it can be provided that the positioning element is supported on the installation support such that said element is held in position relative to the installation support without external force being applied above a specified threshold. To this end, for example, sufficiently high friction can be implemented between the positioning element and the installation support.

The control arm transmits a lifting force to the flap, folding flap, door, or the like acting against the force of gravity acting on the flap, folding flap, door, or the like, potentially separate from a last displacement path when closing the flap, folding flap, door, or the like. When the flap, folding flap, door, or the like is open or partially open, the bearing part is thus displaced along a permissible displacement range thereof in the direction of the acting lifting force. In order to limit the displacement range of the bearing part along the potential displacement path thereof, it can be provided that a stop is disposed on the installation support and limits the displacement path of the bearing part in the direction of a lifting force transmitted from the lifting device to the flap bearing, and that an adjusting means, particularly an adjustment screw, is disposed on the bearing part, by means of which the displacement range of the bearing part can be adjusted in the direction toward the stop. The stop thus initially defines the end position to which the bearing part can be displaced in the direction of the acting lifting force. The adjusting means can be used to displace said end position opposite to the acting lifting force and thus away from the stop. The acting lifting force holds the bearing part in said adjusted end position when the flap, folding flap, door, or the like is open or partially open. The one-sided limit of the displacement range of the bearing part can thus adjust the position thereof relative to the installation support and thus relative to the flap, folding flap, door, or the like.

When closing the flap, folding flap, door, or the like, the incorrectly adjusted bearing part is displaced opposite the lifting force into the correct position thereof by the geometric arrangement of the control arm. In order to mark said position, it can be provided that the positioning element is disposed along the displacement path in the opposite direction as the lifting force transmitted from the lifting device to the flap bearing into the displacement range of the bearing part. The positioning element is thus carried along by the bearing part when closing the flap, folding flap, door, or the like.

In order to avoid the positioning element and/or the bearing part slipping from the installation support when closing the flap, folding flap, door, or the like if the length of the control arm deviates greatly from a suitable length, it can be provided that the displacement range of the positioning element is limited in the direction opposite the lifting force transmitted from the lifting device to the flap bearing by a detent connection between the positioning element and the installation support. For too long a control arm, the displacement of the positioning element and the bearing part bearing thereon is limited by the detent connection when closing the flap, folding flap, door, or the like. The length of the control arm, the position of the flap holder, or the position of the installation support must then first be changed until the potential displacement range of the bearing part is sufficient to correctly position the same. By releasing the detent connection, the positioning element and the bearing part can be removed from the installation support. Accordingly, the installation support can first be attached to the flap, folding flap, door, or the like for installing the flap bearing, then the bearing part connected to the installation support, and finally the positioning element connected to the installation support and attached by the detent connection.

The object relating to the lifting device is achieved by a flap bearing according to the preceding description. The position of the bearing part having the pivot bearing can be adapted easily and quickly to the length of the control arm used. This enables simple and fast installation of the lifting device.

According to a preferred embodiment variant of the invention, it can be provided that the length of the control arm is adjustable in specified detent increments. The length of the control arm can thus first be adjusted at the spacing defined by the detent increments. This can be done by closing the flap, folding flap, door, or the like, in that the length of the control arm adjusts as best as possible according to the potential adjustments defined by the detents. During the initial closing or a further closing of the flap, folding flap, door, or the like, the exact position of the bearing part of the flap bearing is determined by means of the positioning element, as described above, and then adjusted subsequently when the flap, folding flap, door, or the like is open. The flap bearing according to the invention can thus be used for easily and quickly compensating for the imprecision of the length adjustment of the control arm due to the detent spacing.

It can be advantageously provided that the length of the control arm can be fixed by a locking device. The correct length of the control arm is thus determined by closing the flap, folding flap, door, or the like when the locking device is open, and then fixed by means of the locking device when the flap, folding flap, door, or the like is open. The length of the control arm can thus not be inadvertently changed when operating the lifting device.

A sufficiently large displacement range of the bearing part of the flap bearing can be ensured in that successive detent settings of the control arm are each disposed at the same detent spacing to each other, and that the maximum displacement path of the bearing part and/or of the positioning element is greater than or equal to the detent spacing.

The object of the invention relating to the method is achieved in that a positioning element is displaceably or pivotably supported on the installation support; that the positioning element is disposed in a displacement range of the bearing part along the displacement path of the bearing part; that the flap, folding flap, door, or the like is closed, wherein the bearing part strikes the positioning element and displaces the same into a setting position; that the flap, folding flap, door, or the like is opened, wherein the positioning element remains in position; and that the displacement path of the bearing part in the direction of a retaining force transmitted from the flap holder to the bearing part is adjusted and limited relative to the installation support such that the bearing part bears against the positioning element. When closing the flap, folding flap, door, or the like, the bearing part is displaced into the optimal position thereof. Said bearing part thereby carries the positioning element along. When opening the flap, folding flap, door, or the like, the bearing part is displaced away from the optimal position thereof again due to the action of the lever force. The positioning element, however, remains in the position thereof and thus marks the optimal location of the bearing part. The bearing part can now be adjusted to the correct position thereof when the flap, folding flap, door, or the like is open and thus easily accessible. The flap bearing can thus be correctly adjusted by means of the method according to the invention after the flap, folding flap, door, or the like is closed once. An iterative and thus time-intensive adjustment procedure requiring adjusting the flap bearing a plurality of times, followed by checking the adjustment when the flap, folding flap, door, or the like is closed, can be avoided.

It can particularly preferably be provided that a control arm adjustable in length at specified detent increments is used; that in a first method step the flap, folding flap, door, or the like is closed, wherein a length of the control arm is adjusted; that the flap, front flap, door, or the like is opened; that the control arm remains in the set detent setting thereof or is detented at the next shortest detent setting if the detent connection is not detented; that the length of the control arm is fixed by means of a locking device; that the positioning element is pressed against the bearing part; that the flap, folding flap, door, or the like is closed once again, wherein the bearing part strikes the positioning element and displaces the same into a setting position; that the flap, folding flap, door, or the like is opened, wherein the positioning element remains in position; and that the displacement path of the bearing part in the direction of a retaining force transmitted from the flap holder to the bearing part is adjusted and limited relative to the installation support such that the bearing part bears against the positioning element. By using the adjustable length control arm, the lifting device can be easily adapted to various large items of furniture or flaps, folding flaps, doors, or the like. The method thereby enables fast determining and adjusting of both the suitable length of the control arm and the position of the flap bearing. The time required for installing the lifting device is thereby significantly reduced. At the same time, the lifting device can be adjusted so that the flap, folding flap, door, or the like closes completely.

Figure 2:
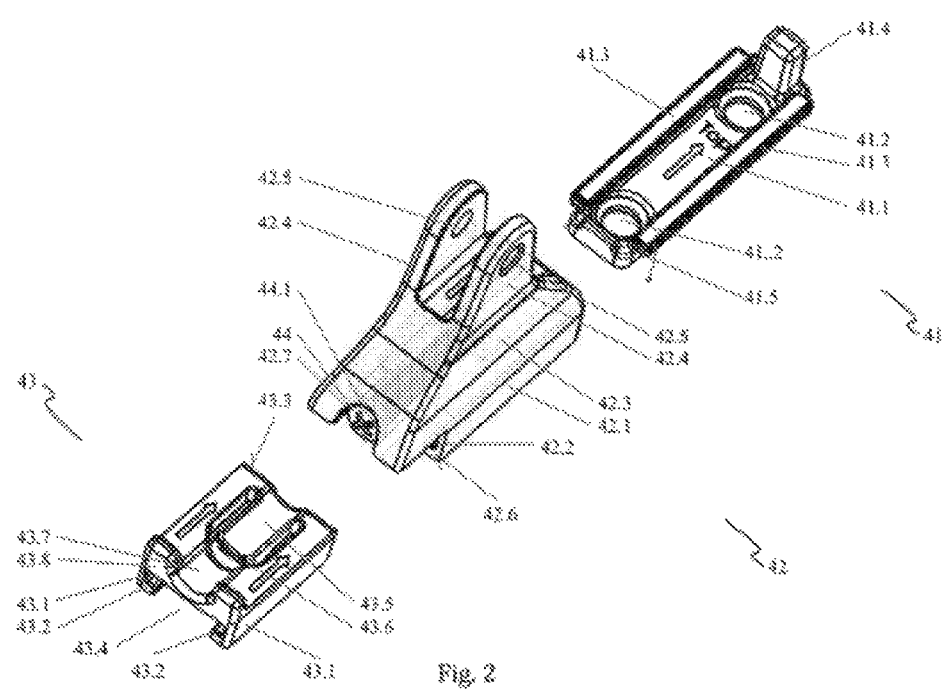
Figure 3:
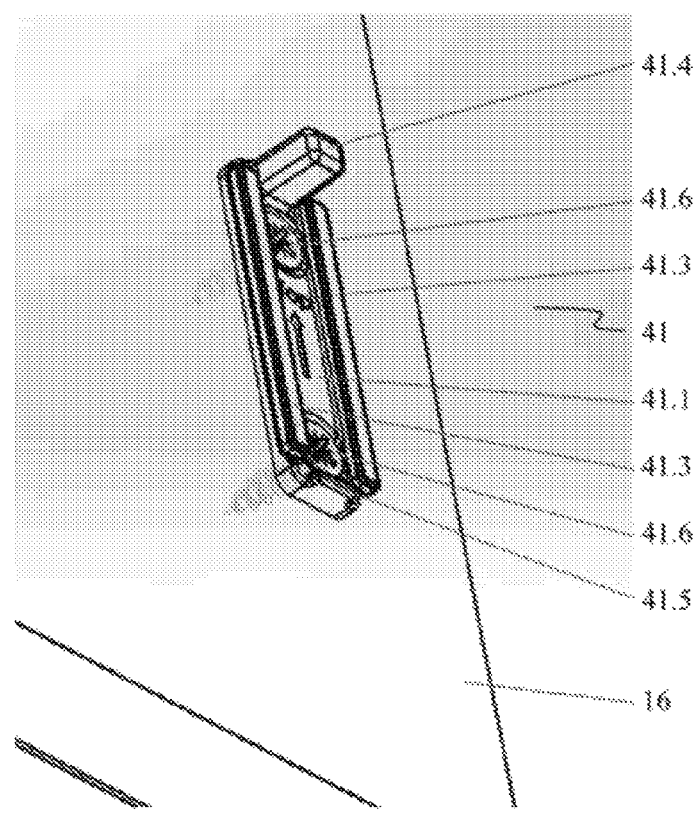
Figure 4:
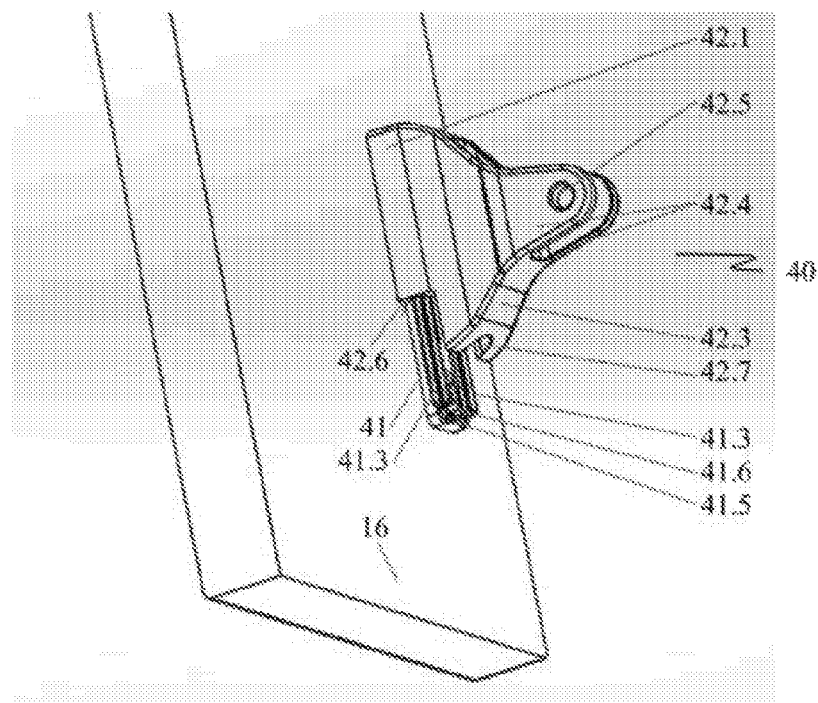
Figure 5:
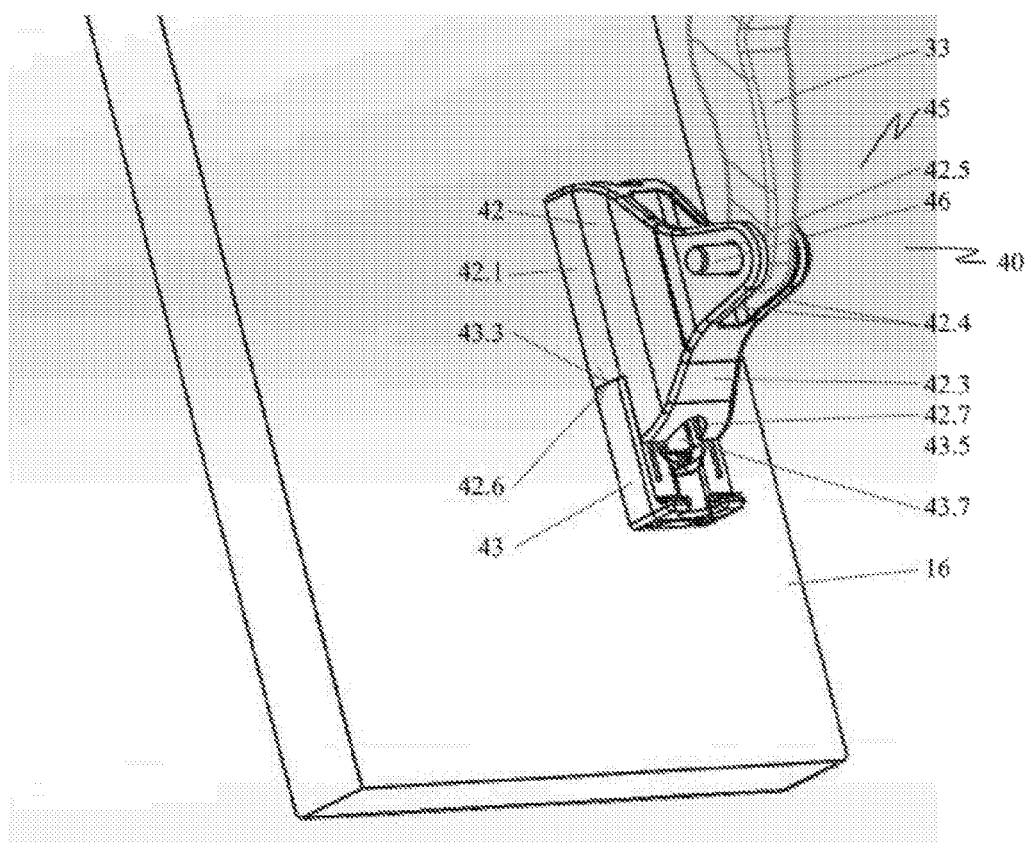
Figure 6:
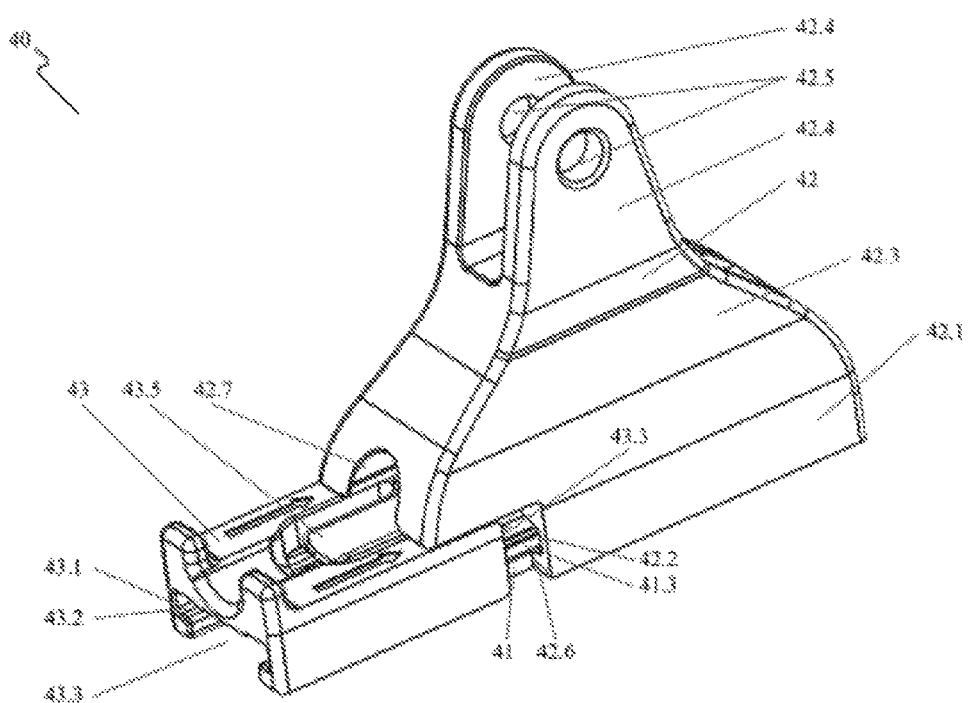
Figure 7:
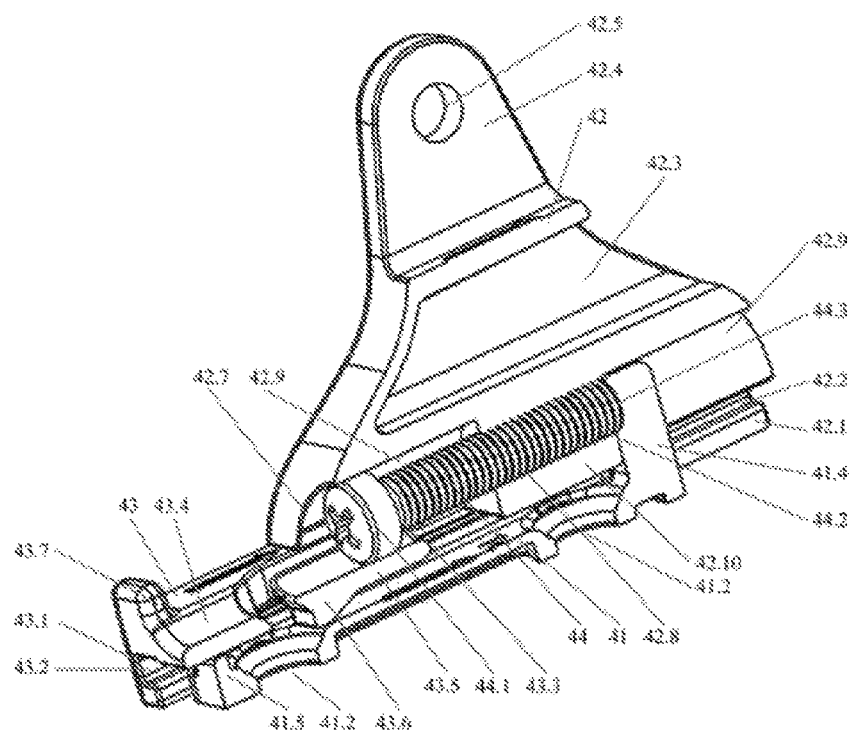
Figure 8:
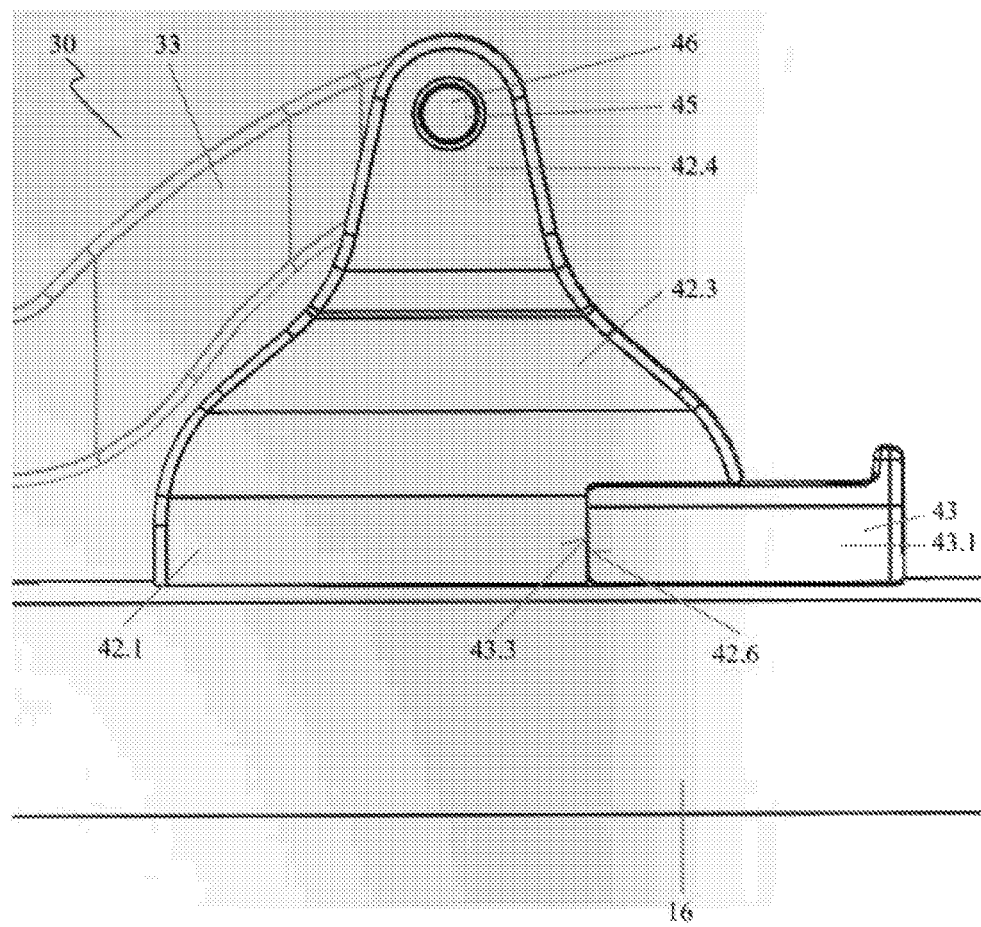
Figure 9:
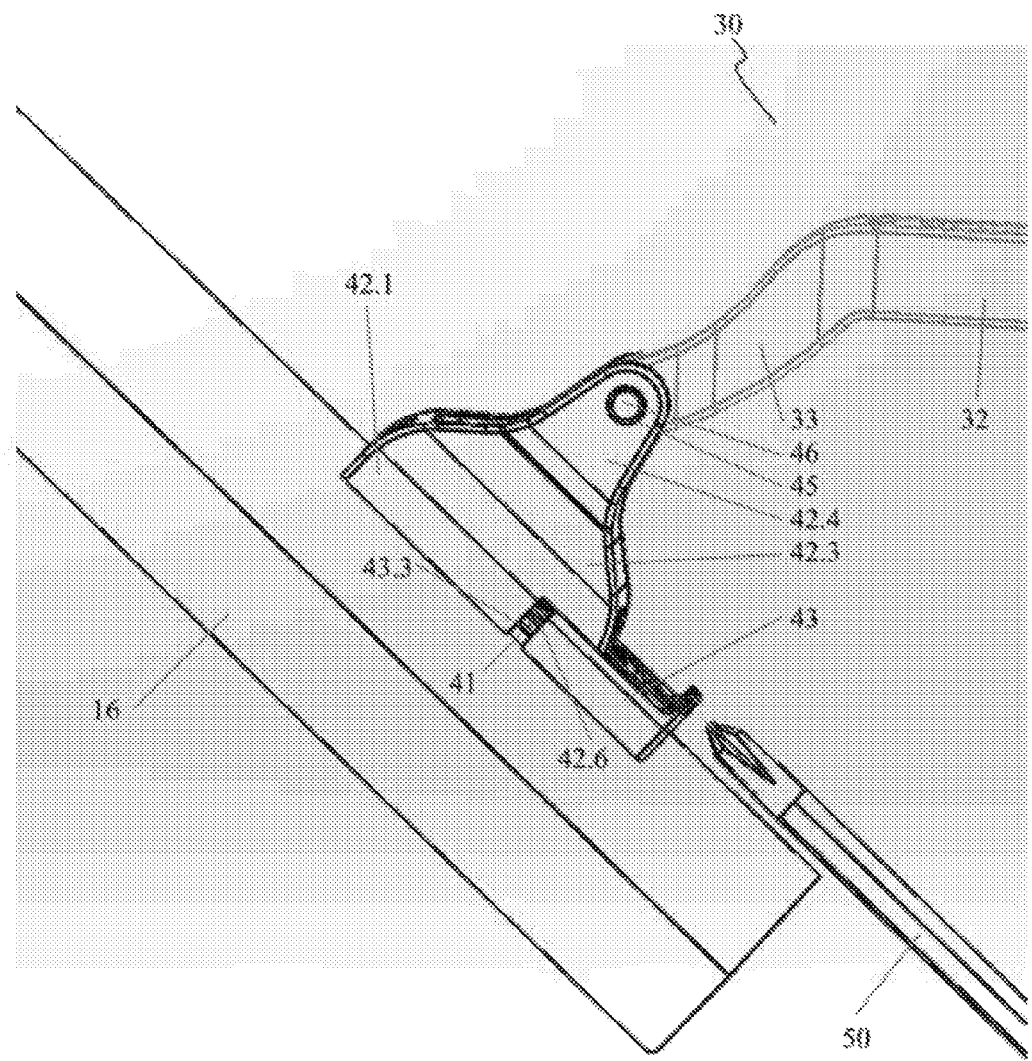
Figure 10:
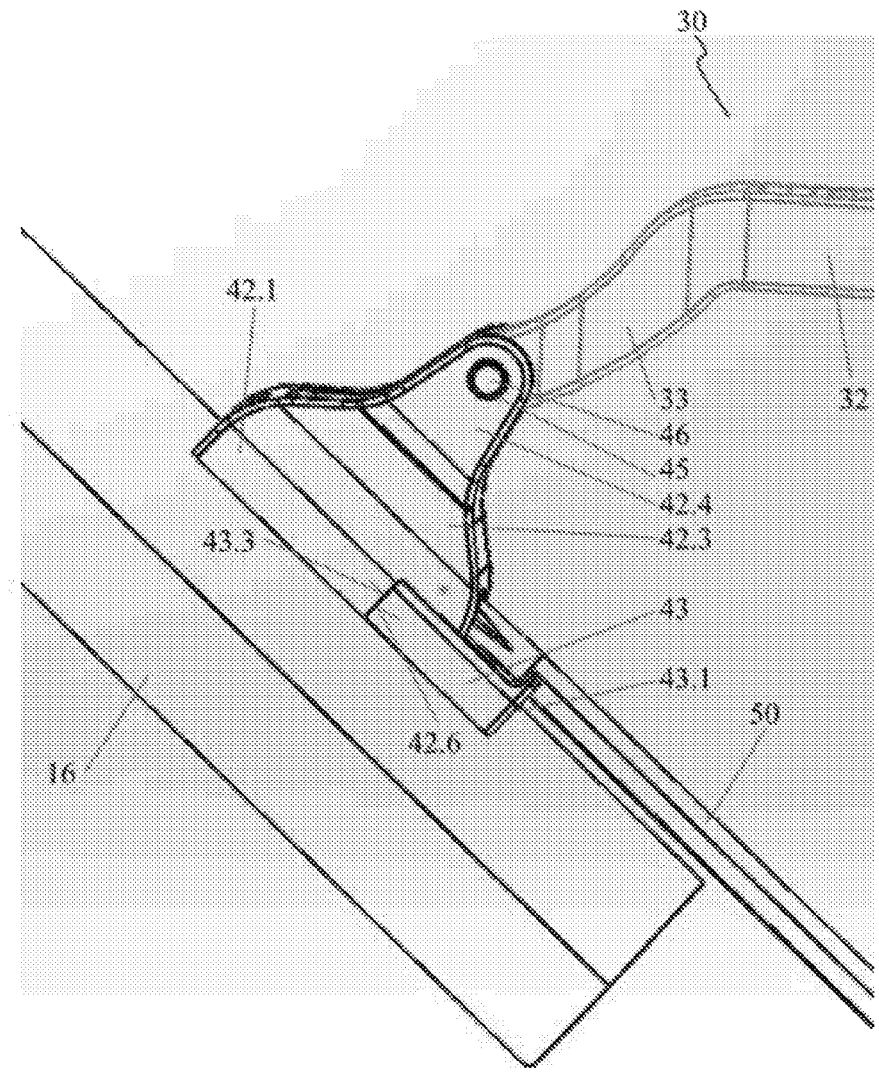

The invention is described in greater detail below using an embodiment example shown in the drawings. They show:

FIG. 1 A side view of a lifting device for a folding flap of an item of furniture, FIG. 2 A perspective exploded view of a flap bearing, FIG. 3 A perspective view of an installation support of the flap bearing shown in FIG. 2, FIG. 4 A perspective view of the installation support shown in FIG. 3 having a bearing part slid on, FIG. 5 A perspective view of the installed flap bearing having a partially installed control arm, FIG. 6 A perspective view of the flap bearing shown in FIG. 2 having the bearing part and positioning element disposed spaced apart from each other, FIG. 7 A side perspective section view of the flap bearing shown in FIG. 6, FIG. 8 A side view of the installed flap bearing shown in FIG. 5 during a first method step for adjusting the flap bearing, FIG. 9 A perspective side view of the flap bearing shown in FIG. 8 during a second method step for adjusting the flap bearing, and FIG. 10 A perspective side view of the flap bearing shown in FIG. 9 after completing the adjustment.

FIG. 1 shows a side view of a lifting device for a folding flap of an item of furniture 10. The item of furniture 10 is implemented here as a wall cupboard. In the detail shown, the furniture frame comprises a side wall 11 and a cabinet floor 12. The interior space of the item of furniture 10 is subdivided by shelves 13. To this end wall holes 14 are made in the side wall 11 and in a second side wall of the item of furniture 10 disposed opposite the side wall 11 and not shown. Mounting elements, not shown, are inserted in said holes, on which the shelves 13 rest. The wall holes 13 are spaced apart from each other at a fixed, specified hole spacing 18. The hole spacing 18 is standardized and here is 32 mm.

The item of furniture 10 can be closed by means of the folding flap shown partially opened here. The folding flap is formed by a first and a second partial flap 15, 16. The two partial flaps 15, 16 are thereby connected to each other by means of a central hinge 17. The first partial flap 15 is hinged to the furniture frame by means of a furniture hinge, not shown, and attached there to a cabinet top of the item of furniture 10. It is also conceivable, however, to provide a single flap.

The lifting device supports the opening and closing operation of the folding flap. Said device is implemented here for holding the folding flap in position even in a partially open condition. To this end, said device comprises a flap holder 20 attached to the side wall 11 of the item of furniture. The flap holder 20 is fixed at at least one of the wall holes 14. The installed position of the flap holder 20 can be selected depending on the size of the item of furniture 10 and the folding flap. The potential installed positions are thereby specified by the locations of the wall holes 14. A housing of the flap holder 20 is covered by a top. A holding protrusion 21 extends out of the housing. The holding protrusion 21 is part of a lever pivotally supported on the flap holder 20. One end of the control arm 30 of the lifting device is connected to the holding protrusion 21. An energy store, not shown, is disposed in the housing of the flap holder 20, here in the form of a spring assembly, and is directly connected to the lever. The holding protrusion 21 transmits the spring force to the control arm 30, wherein the spring force acts in the direction of an opening motion of the folding flap.

The control arm 30 in the embodiment example shown comprises a first and a second telescoping arm 31, 32. The first telescoping arm 31 thereby forms an outer telescoping arm in which the second telescoping arm 32 is linearly displaceably supported as an inner telescoping arm. By sliding the second telescoping arm 32 correspondingly relative to the first telescoping arm 31, the length of the control arm 30 can be changed and fixed by means of a locking device, not shown. It is also conceivable, however, to use a control arm having a non-adjustable length. The second telescoping arm 32 comprises a mounting segment 33 at the end thereof facing toward the flap bearing. The mounting segment 33 is curved in shape. At the end thereof, the mounting segment 33 is pivotably connected to a flap bearing 40 by means of a pivot bearing 45. The flap bearing 40 is attached at the inner surface of the second partial flap 16. Said bearing comprises a bearing part 42 and a positioning element 43.

For opening and closing the item of furniture 10, the first partial flap 15 of the folding flap is pivoted about the furniture hinge, not shown, at the top edge of the item of furniture. The second partial flap 16 is thereby guided by the central hinge 17 and the lifting device. The lifting device transmits the force acting in the opening direction of the folding flap from the flap holder 20 to the folding flap by means of the control arm 30 and the flap bearing 40. The two partial flaps 15, 16 are pivoted in a folding motion about the central hinge 17, such that said flaps are oriented at an acute angle to each other and are supported by the lifting device in the upper region of the item of furniture 10.

In the closed state, the two partial flaps 15, 16 contact the furniture frame in a plane. The control arm 30 is then disposed in the interior of the item of furniture 10 and runs to the side of the folding flap. The curved shape of the mounting segment 33 guides the control arm 30 to the pivot bearing 45 on the flap bearing 40 protruding into the furniture frame when the folding flap is closed.

The closed state of the folding flap defines the required spacing between the centers of rotation of the control arm 30 on the pivot bearing 45 and on the flap holder 20. If the spacing is too great or too short, the folding flap cannot be closed so as to completely contact the furniture frame. In order to enable precise adjustment of the spacing between the centers of rotation of the control arm 30 and thus complete closing of the folding flap, particularly when using a control arm 30 not adjustable in length or discontinuously adjustable in length at specified detent increments, the position of the pivot bearing 45 can be adjusted relative to the second partial flap 16. To this end, the bearing part 42 supporting the pivot bearing 45 is displaceably supported. Said bearing part comprises a displacement mechanism by means of which the position thereof can be adjusted. The displacement mechanism, however, is accessible only when the folding flap is open. In order to enable simple and fast adjustment of the position of the flap bearing 40 when the folding flap is open as well, without checking the same by repeatedly closing the folding flap, the flap bearing 40 comprises a positioning element 43 according to the invention.

FIG. 2 shows a perspective exploded view of the flap bearing 40. An installation support 41, the bearing part 42, and the positioning element 43 are thereby disposed in alignment with each other. The installation support 41 of the flap bearing 40 comprises a base plate 41.1. Two mounting holes 41.2 are made in the base plate 41.1 spaced apart from each other. The mounting holes 41.2 serve for attaching the installation support 41 to a furniture component, here to the second partial flap 16 of the folding flap shown in FIG. 1. The installation support 41 comprises an elongated, rectangular base shape. Two guides 41.3 are integrally formed on the sides of the base plate 41.1. The guides 41.3 are oriented in the direction of the longitudinal extent of the installation support 41. Said guides are implemented in the form of two guide rails spaced apart from each other and running parallel to each other. The guides are oriented in the direction toward the bearing part 42 along the longitudinal extent thereof. Said guides run in a straight line. A stop 41.4 is formed on the base plate 41.1 at the end of the installation support 41 facing away from the bearing part 42. The stop 41.4 protrudes past the plane formed by the guides 41.3. A latching edge 41.5 is formed on the base plate 41.1 of the installation support 41 opposite the stop 41.4.

The bearing part 42 comprises a base part 42.3. Two bearing legs 42.4 are formed on the base part 42.3 spaced apart from each other. One axial hole 42.5 is formed in each of the bearing legs 42.4. The axial holes 42.5 in the opposite bearing legs 42.4 are aligned to each other. A guide segment 42.1 is formed on the base part 42.3 opposite the bearing legs 42.4. The guide segment 42.1 forms two guide grooves 42.2 disposed opposite each other and spaced apart from each other. The guide grooves 42.4 run in straight lines. The longitudinal extent of said guide grooves is oriented in the direction of the guides 41.3 of the installation support 41. The guide grooves 42.4 and the guides 41.3 are mutually matched such that the guide segment 42.1 of the bearing part 42 can be slid onto the installation support 41. The guides 41.3 of the installation support 41 and the guide grooves 42.2 of the bearing part 42 thereby implement a linear guide. The bearing part 42 can be slid along said linear guide relative to the installation support 41. The guides 41.3 and the guide grooves 42.2 thus define a displacement path of the flap bearing 40. The displacement path defines the two potential displacement directions of the bearing part 42 relative to the installation support 41. The displacement path is thereby limited by the stop 41.4. The guide segment 42.1 of the bearing part 42 is implemented shorter than the adjacent base part 42.3 relative to the installation support 41. The base part 42.3 thus protrudes past the guide segment 42.1 on the side thereof facing the positioning element 43. A receiving region for the positioning element 43 is thereby implemented as an extension of the guide segment 42.2 and covered by the overhang of the base part 42.3. Facing the positioning element 43, the guide segment 42.1 is closed by a first contact surface 42.6. An adjusting screw 44 is disposed in the base part 42.3 of the bearing part 42. In the selected view, only the screw head 44.1 of the adjusting screw 44 having a tool receptacle, here a Philips head, is visible. A tool receptacle 42.7 formed in the base part enables access to the adjusting screw 44.

The positioning element 43 comprises a guide region 43.1 implementing two grooves 42.3 spaced apart and opposite each other. The grooves 43.2 are oriented in the direction of the guide grooves 42.2 of the bearing part 42 and thus of the guides 41.3 of the installation support 41. The guide region 43.1 is formed on a base body 43.8 of the positioning element 43. The base body 43.8 and the guide region 43.1 enclose an installation support receptacle 43.4. A trough-shaped tool guide 43.7 is formed in the positioning element 43 opposite the installation support receptacle 43.4. The tool guide 43.7 is oriented toward the bearing part 42. A detent tab 43.5 is connected to the positioning element 43 along the tool guide 43.7. The detent tab 43.5 implements a detect lug 43.6 protruding into the installation support receptacle 43.4 at the end thereof. The positioning element 43 is closed off by a second contact surface 43.3 facing toward the bearing part 42. The guide region 43.1 of the positioning element 43 is implemented such that the grooves 43.2 thereof can be slid onto the guides 41.3 of the installation support 41 and displaced along the same.

FIG. 3 shows a perspective view of the installation support 41 of the flap bearing 40 shown in FIG. 2, The installation support 41 is connected to the second partial flap 16 of the folding flap by means of two mounting screws 41.6 inserted through the mounting guides 41.2 in the base plate 41.1.

FIG. 4 shows a perspective view of the installation support 41 shown in FIG. 3 having the bearing part 42 slid on. The bearing part 42 is slid onto the guides 41.3 of the installation support 41 far enough to make contact at the end with the stop 41.4 of the installation support 41 covered by the bearing part 42. The displacement range of the bearing part 42 along the displacement path formed by the guides 41.3 and the guide grooves 42.2 is thus limited by the stop 41.4. The base part 42.3 of the bearing part 42 tapers down in the direction of the longitudinal extent of the installation support 41 on the side facing away from the guide segment 42.1. The bearing legs 42.4 taper down further toward the ends thereof, starting from the base part 42.3. The axial holes 42.5 are thus disposed in a narrow end region of the bearing legs 42.4 in the displacement direction of the bearing part 42.

FIG. 5 shows a perspective view of the flap bearing 40 having a partially installed control arm 30 installed on the second partial flap 16 of the folding flap. The bearing part 42 and the positioning element 43 are slid onto the installation support 41. The bearing part 42 thereby bears upon the covered stop 41.4. The positioning element 43 is slid onto the guides 41.3 of the installation support 41 far enough that the second contact surface 43.3 thereof bears upon the first contact surface 42.6 of the guide segment 42.1 of the bearing part 42. Said element is thus partially disposed in the receiving region of the bearing part 42 formed by the overhang of the base part 42.3 relative to the guide segment 42.1. The tool guide 43.7 of the positioning element 43 and the tool receptacle 42.7 of the bearing part 42 are disposed relative to each other so as to expose an access to the adjusting screw 44 shown in FIG. 2. The detent tab 43.5 is disposed in the region of the covered installation support 41 such that the detent lug 43.6 formed on the end of the detent tab 43.5 and covered by the detent tab 43.5 is disposed in the region between the two guides 41.3 of the installation support 41. When the positioning element 43 is slid away from the bearing part 42, the detent lug 43.6 strikes the detent edge 41.5 of the installation support 41 shown in FIGS. 2 and 3. The displacement range of the positioning element 43 is thus limited by the detent lug 43.6 and the detent edge 41.5.

The control arm 30 is aligned relative to the flap bearing 40 such that an axial penetration made in the end of the mounting segment 33 thereof is aligned with the axial holes 42.5 of the bearing part 42. An axial pin 46 can thus be inserted through the axial holes 42.5 and the axial penetration, whereby the pivot bearing 45 is implemented.

FIG. 6 shows a perspective view of the flap bearing 40 shown in FIG. 2 having the bearing part 42 and positioning element 43 disposed spaced apart from each other. The guide grooves 42.2 of the bearing element 42 are slid onto the guides 41.3 of the installation support 41. The grooves 43.2 of the positioning element 43 are correspondingly guided on the guides 41.3. The bearing element 42 and the positioning element 43 can be slid along the displacement path defined by the guides 41.3 independently of each other. The displacement range of the positioning element 43 can be limited by the engagement of the detent lug 43.6 of the detent tab 43.5 thereof on the detent edge 41.5 of the installation support 41 and by the bearing part 42 on the opposite side when said bearing part bears upon the stop 41.4 of the installation support 41 in the end position thereof. The displacement range of the bearing part 42 is in turn limited by the stop 41.4 and by the positioning element 43 when said element is in the end position defined by the detent lug 43.6 and the detent edge 41.5. The bearing part 42 and the positioning element 43 can be slid jointly between the two end positions defined by the stop 41.4 and the detent edge 41.5. Said components can thereby strike each other at the first and second contact surfaces 42.6, 43.3 and thus carry each other along.

FIG. 7 shows a side perspective section view of the flap bearing shown in FIG. 6. The bearing part 42 and the positioning element 43 are guided on the installation support 41. The guide segment 42.1 of the bearing part 42 comprises two side parts guided past and spaced apart from each other and opposite the installation support 41. Only one side part is visible in the selected section view. The guide grooves 42.2 are formed on the side parts. A receiving region 42.9 is implemented between the side parts. A protrusion 42.10 is formed on the side parts and the base part 42.3. The protrusion 42.10 protrudes into the receiving region 42.9 between the two side parts of the guide segment 42.1. The protrusion 42.10 closes off in front of the guide grooves 42.2 on the side thereof facing away from the base part 42.3. A threaded hole 42.8 is made in the protrusion 42.10. The threaded hole 42.8 is oriented in the direction of the displacement motion of the bearing part 42 relative to the installation support 41. The adjusting screw 44 is threaded into the threaded hole 42.8 by means of a thread 44.2. The screw head 44.1 thereof faces in the direction toward the positioning element 43, while one end of the screw 44.3 is oriented toward the stop 41.4 of the installation support 41. The stop 41.1 is disposed in the segment of the receptacle region 42.9 facing away from the positioning element 43. The screw head 44.1 of the adjusting screw 44 is positioned opposite in the segment of the receiving region 42.9 facing away from the positioning element 43. The screw head 44.1 thus faces the tool receptacle 42.7 of the bearing part 42 and the tool guide 43.7 of the positioning element 43 and thus accessible from the outside.

The base plate 41.1 of the installation support 41 having the guides 41.3 formed thereon is disposed partially in the receiving region 42.9, depending on the position of the bearing part 42 relative to the installation support 41.

In the setting of the adjusting screw 44 shown, said screw is turned out of the threaded hole 42.8 of the bearing part 42 far enough that the screw end 44.3 thereof does not protrude out of the end of the protrusion 42.10. The bearing part 42 is slid onto the installation support 41 far enough that the protrusion 42.10 thereof bears upon the stop 41.4 of the installation support 41. The displacement range of the bearing part 42 is thus limited by the contact of the protrusion 42.10 against the stop 41.4. This represents the maximum potential displacement range of the bearing part 42 in the direction of the stop 41.4. By turning the adjusting screw 44 into the protrusion 42.10, the screw end 44.3 of said screw strikes the stop 41.4. The bearing element 42 is thereby displaced along the displacement path defined by the guides 41.3 away from the stop 41.4 and toward the positioning element 43. The displacement path of the displacement part 42 can thus be limited by the adjusting screw 44 in the direction facing away from the positioning element 43.

The grooves 43.2 of the positioning element 43 are slid onto the guides 41.3 of the installation support 41. The detent lug 43.6 thereof is thereby guided in the region between the guides 41.3 of the installation support 41. The detent lug 43.6 is disposed at the height of the detent edge 41.5 of the installation support 41 in the direction facing away from the bearing part 42. The displacement range of the positioning element 43 away from the bearing part 42 is thus limited by the detent lug 43.6 bearing on the detent edge 41.5.

For installing the flap bearing 40 on a flap, folding flap, door, or the like, the installation support 41 is first screwed to the flap, folding flap, door, or the like using the mounting screws 41.6 shown in FIG. 3. The bearing part 42 and then the positioning element 43 are then slid onto the installation support 41. The detent lug 43.6 forms a starting bevel facing in the direction of the sliding motion of the positioning element 43 onto the installation support 41. Said bevel slides past the detent edge 41.5 on the installation support 41 when sliding on the positioning element 43 and thereby raises the detent tab 43.5. After passing the detent edge 41.5, the elastic detent tab 43.5 springs back to the original position thereof, so that the detent edge 41.5 is in the displacement path of the detent lug 43.6 and thereby limits the displacement range of the positioning element 43. After the flap bearing 40 is attached and installed on the flap, folding flap, door, or the like, the control arm is connected in an articulated manner to the axial holes 42.5 of the bearing part 42 by means of the axial pin 46 shown in FIG. 5.

The adjusting procedure of the flap bearing 40 is described below using FIGS. 7 through 10 using the example of a folding flap. The folding flap is first opened when the lifting device is fully installed and the adjusting screw 44 is threaded out of the protrusion 42.10 so far that the end of the screw 44.3 no longer protrudes out of the threaded hole 42.8 of the protrusion 42.10. The lifting force transmitted from the control arm 30 to the bearing part 42 presses the protrusion 42.10 of the bearing part 42 along the displacement path thereof against the stop 41.4 of the installation support 41. In said position, the positioning element 43 is slid against the bearing part 42, so that the second contact surface 43.3 thereof bears on the first contact surface 42.6 of the bearing part 42. The folding flap is then closed.

FIG. 8 shows a side view of the installed flap bearing 40 shown in FIG. 5 during a first method step for adjusting the flap bearing 40. To this end, the folding flap is closed such that said flap correctly contacts the furniture frame. The position of the bearing part 42 taken on when the protrusion 42.10 bearing on the stop 41.4 corresponds to a setting for a shorter control arm 30 than the one used. The greater length of the control arm 30 used causes the bearing part 42 of the flap bearing 40 to be displaced along the displacement path thereof when closing the folding flap, such that the correct spacing results between the pivot bearing 45 on the flap bearing 40 and the corresponding bearing of the control arm 30 on the flap holder 20. The bearing part 42 thereby strikes the positioning element 43 and displaces the same along the displacement path.

FIG. 9 shows a perspective side view of the flap bearing 40 shown in FIG. 8 during a second method step for adjusting the flap bearing 40. Starting from the adjusted situation shown in FIG. 8, the folding flap is opened, as can be seen by the control arm 30 oriented at an angle to the second partial flap 16. The lifting force of the flap holder 20 transmitted from the control arm 30 to the flap bearing 40 displaces the bearing part 42 along the displacement path thereof in the direction of the acting lifting force when opening the folding flap. The displacement range of the bearing part 42 is thereby limited by the protrusion 42.10 thereof bearing on the stop 41.4 of the installation support 41. The positioning element 43 is designed so that the position thereof does not change without an external force effect above a defined threshold value. To this end, by designing the guide 41.3 of the installation support 41 and the grooves 43.2 of the positioning element 43 accordingly, sufficiently high friction is implemented between the two components. The positioning element 43 accordingly marks the position of the bearing part 42 when the folding flap is closed. Said element thus marks the precise position of the bearing part 42 at which complete closing of the folding flap is made possible for the present length of the control arm 30. A tool 50 can now be inserted through the tool guide 43.7 on the positioning element and the tool receptacle 42.7 on the bearing part to the adjusting screw 44 shown in FIG. 7 for adjusting the position of the bearing part 42. By turning in the adjusting screw 44, the screw end 44.3 of said screw bears upon the stop 41.4 of the installation support 41, as described in FIG. 7. The bearing part 42 is thereby slid in the direction toward the positioning element 43.

FIG. 10 shows a perspective side view of the flap bearing 40 shown in FIG. 9 after completing the adjustment. The tool is thereby still guided to the adjusting screw 44. By screwing in the adjusting screw 44, the bearing part 42 is advanced to the positioning element 43 when the folding flap is open. The bearing part 42 is thereby displaced only so far in the direction toward the positioning element 43 that said element remains in position. The first contact surface 42.6 of the bearing part 42 accordingly bears lightly upon the second contact surface 43.3 of the positioning element 43. The bearing part 42 is now in the position assumed thereby when the folding flap is closed according to FIG. 8. The position of the bearing part 42 is thus optimally adjusted in order to enable complete closing of the folding flap. The acting lifting force presses the screw end 44.3 of the adjusting screw 44 of the bearing part 42 against the stop 41.1 of the installation support 41. Said lifting force acts in all partially open positions of the folding flap, so that the bearing part 42 is held in contact with the stop 41.4 and is not displaced in the direction of the positioning element 43.

The adjustment of the position of the flap bearing 40 can thus be advantageously performed in an adjustment operation when the flap, folding flap, door, or the like is open. Repeated opening and closing of the flap, folding flap, door, or the like for adjusting and checking the position of the bearing part 42 each time is not required. The time required for adjusting the flap bearing 40 is thereby significantly reduced. This applies particularly if two or more lifting devices are provided on the flap, folding flap, door, or the like and each must be adjusted separately, wherein the closing motion of an individual lifting device is influenced by the adjustment of the other lifting devices. By using the flap bearing 40 according to the invention, the optimal position of all flap bearings 40 provided on a flap, folding flap, door, or the like can be determined by one single closing operation of the flap bearing. The position of the individual flap bearings 40 is then performed when the flap, folding flap, door, or the like is open by correspondingly limiting the displacement ranges of each bearing part 42 in the direction toward the stops 41.4 of the installation support 41. The optimal position of each bearing part 42 is thereby determined and adjusted separately, whereby any installation tolerances present can be compensated for.

The flap bearing 40 according to the invention can be used advantageously with control arms 30 having a length adjustable in specified detent increments. The detent increments are preferably spaced apart from each other by a constant detent spacing. The length of the control arm 30 is adjusted to the required length according to the spacing defined by the detent increments, and then locked by means of a locking device. One such control arm 30 can thus be used for items of furniture 10 of different sizes and flaps, folding flaps, doors, and the like of different sizes. Said arm can, however, only be adjusted at a spacing defined by the detent increments to the length required in order to enable complete closing of the flap, folding flap, door, or the like. The fine adjustment is then performed by means of the flap bearing 40 according to the invention. In a first adjusting step, the best possible length of the control arm is thus first determined. The flap, folding flap, door, or the like is thereby closed when the locking device of the control arm 30 is open and the displacement range of the bearing part 42 of the flap bearing 40 is at a maximum. The length of the control arm 30 is thereby adjusted, wherein the control arm 30 detents at a detent increment or remains between two detent increments. The flap, folding flap, door, or the like is then opened. The control arm 30 thereby remains at the detented length thereof, or if at an intermediate setting, is displaced into the next shorter detent position. The length of the detent arm 30 thus determine is fixed by means of a locking device. The exact position of the bearing part 42 of the flap bearing 40 is then determined and adjusted by means of the positioning element 43 and by again closing the flap, folding flap, door, or the like, as described for FIGS. 8 through 10. The displacement range of the bearing part 42 and/or of the positioning element 43 advantageously corresponds to at least the detent spacing between adjacent detent increments of the control arm 30. The displacement range is thus sufficiently large to be able to compensate for a length deviation of the control arm 30 at the spacing of the detents thereof.

The invention claimed is:

1. A flap bearing for coupling a control arm of a prestressed lifting device in an articulated manner to a flap of an item of furniture, the flap bearing comprising:
   an installation support configured to be fastened to the flap;
   a bearing part including a pivot bearing configured to be coupled to the control arm, the bearing part being displaceably supported on the installation support such that the bearing part is displaceable in a displacement range relative to the installation support along a displacement path: and
   a positioning element displaceably supported on the installation support such that the positioning element is disposed in the displacement range of the bearing part along the displacement path;
   wherein the installation support includes a stop configured to limit the displacement path of the bearing part in a direction of a lifting force transmitted from the control arm to the flap bearing; and
   wherein the bearing part includes an adjustment screw configured to adjust the displacement range of the bearing part in the direction of the lifting force.

2. The flap bearing of claim 1, wherein:
   displacement directions of the positioning element and the bearing part are identically oriented.

3. The flap bearing of claim 1, wherein:
   the installation support includes a guide; and
   the bearing part and the positioning element are supported on the guide.

4. The flap bearing of claim 3, wherein:
   the guide is configured to guide the bearing part and the positioning element on a linear path.

5. The flap bearing of claim 1, wherein:
   the positioning element is supported on the installation support such that the positioning element is held in position relative to the installation support without external force above a specified threshold value being applied.

6. The flap bearing of claim 1, wherein:
   the positioning element is disposed along the displacement path in a direction from bearing part opposite of the lifting force.

7. The flap bearing of claim 1, wherein:
   a displacement range of the positioning element is limited in a direction from the bearing part opposite of the lifting force by a latching connection between the positioning element and the installation support.

8. A lifting device including the flap bearing of claim 1 in combination with the control arm.

9. The lifting device of claim 8, wherein:
   the control arm is adjustable in length.

10. A method of adjusting a flap bearing relative to a flap of an item of furniture,
    the flap bearing including:
      an installation support fastened to the flap,
      a bearing part including a pivot bearing, the bearing part being supported on the installation support for displacement along a displacement path, and
      a positioning element displaceably supported on the installation support;
    the item of furniture including a flap holder fastened to a furniture frame, and a control arm pivotally connected to the pivot bearing and the flap holder;
    the method comprising:
    (a) displaceably supporting the positioning element on the installation support, such that the positioning element is disposed in a displacement range of the bearing part along the displacement path of the bearing part;
    (b) closing the flap such that the bearing part strikes the positioning element and displaces the positioning element into a setting position;
    (c) opening the flap while the positioning element remains in the setting position; and
    (d) adjusting and limiting the displacement path of the bearing part relative to the installation support in a direction of a retaining force transmitted from the flap holder to the bearing part such that the bearing part bears against the positioning element.

* * * * *